United States Patent Office 3,462,489
Patented Aug. 19, 1969

---

3,462,489
N-ALKYL- AND N-CYCLOALKYL-BIS(TRIFLUOROMETHYL)-KETENIMINES AND THE PREPARATION THEREOF
Maynard S. Raasch, Wilmington, Del., assignor to E. I. du Pont de Nemours and Company, Wilmington, Del., a corporation of Delaware
No Drawing. Filed Aug. 28, 1967, Ser. No. 663,523
Int. Cl. C07c 87/26, 87/32
U.S. Cl. 260—566                                     8 Claims

ABSTRACT OF THE DISCLOSURE

N-alkyl- and N-cycloalkyl-bis(trifluoromethyl)ketenimines useful as antistatic agents for wool which are prepared by reacting bis(trifluoromethyl)thioketene with a dialkylsulfur diimide are claimed.

BACKGROUND OF THE INVENTION

This invention relates to fluorinated ketenimines and to a process for the preparation thereof.

SUMMARY OF THE INVENTION

This invention is directed to a compound of the formula $$(CF_3)_2C=C=N-R$$

wherein R is alkyl of up to 18 carbons or cycloalkyl of 4–7 carbons.

The compounds of this invention are produced by a process which comprises reacting bis(trifluoromethyl)thioketene with a dialkylsulfur diimide of the formula $$R-N=S=N-R$$

where R is alkyl of up to 18 carbons or cycloalkyl of 4–7 carbons. The compounds of this invention are useful as a treating agent for imparting antistatic properties to wool.

DESCRIPTION OF THE PREFERRED EMBODIMENTS

The products of this invention are the N-alkylbis-(trifluoromethyl)ketenimines of the formula $$(CF_3)_2C=C=N-R$$

where R is an alkyl radical of 1–18 carbon atoms. These products are prepared by reacting bis(trifluoromethyl)thioketene with a dialkylsulfur diimide in accordance with the equation:

$$2(CF_3)_2C=C=S + R-N=S=N-R \rightarrow 2(CF_3)_2C=C=N-R + 3S$$

The starting materials used in the process of this invention have been reported in the literature. Bis(trifluoromethyl)thioketene is described in U.S. Patent 3,275,609 to M. S. Raasch. The sulfur diimides are a known class of compounds and are made by the reaction of a primary amine with a sulfur halide. Thus, dimethylsulfur diimide is made by the reaction of methylamine and sulfur tetrafluoride [B. Cohen and A. G. MacDiarmid, J. Chem. Soc., 1780 (1966)]; dibutylsulfur diimide can be prepared by the reaction of n-butylamine and sulfur tetrachloride [M. Goehring and G. Weis, Angew. Chem., 68, 678 (1956)]; di-tert-butylsulfur diimide and bis(1,1,3,3-tetramethylbutyl)sulfur diimide can be made by the reaction of tert-butylamine and 1,1,3,3-tetramethylbutylamine, respectively, with sulfur dichloride followed by pyrolysis of the primary product [D. H. Clemens, A. J. Bell, and J. L. O'Brien, Tetrahedron Letters, 1487 (1965)]. One or more of these methods can be used to convert any primary alkylamine having up to 18 carbon atoms to the corresponding dialkylsulfur diimide of the formula $$R-N=S=N-R$$

where R is alkyl of 1–18 carbons.

The reaction between bis(trifluoromethyl)thioketene and the dialkylsulfur diimide is slightly exothermic and proceeds at temperatures as low as 0° C. or even lower. Moderate heating, e.g., up to 100° C., can be used if desired to complete the reaction. A convenient range of reaction temperature is 0–50° C. Some of the sulfur diimides are not stable at higher temperatures. The tert-alkylsulfur diimides are quite stable and reactions using them can be run at more elevated temperatures. Since bis(trifluoromethyl)thioketene boils at 52° C., operation above this temperature is best carried out under a reflux system or in a closed vessel. The reactants may also be passed through a tube at the desired temperature in a continuous process, if necessary under reduced pressure and/or with the help of an inert carrier gas.

A solvent or diluent for the reaction is not necessary. However, it is often convenient to operate in an inert liquid medium that can disperse or dissolve the by-product sulfur. Suitable inert solvents are the liquid hydrocarbons or halohydrocarbons such as n-hexane, cyclohexane, benzene, toluene, dichloromethane, carbon tetrachloride, dichlorotetrafluoroethane, 1,1,2-trichloro-1,2,2-trifluoroethane, chlorobenzene, and the like. Preferably, the boiling point of the solvent should be such that it can readily be separated from the product by distillation, desirably below 120° C. at ordinary pressure.

The relative proportions of the two reactants are not critical since the reaction will proceed regardless of what they are. The best results are generally obtained by using at least 1, and preferably from 2 to 2.5 moles of bis(trifluoromethyl)thioketene per mole of dialkylsulfur diimide.

The reaction product, i.e., the N-alkylbis(trifluoromethyl)ketenimine, can be separated from the reaction mixture by any suitable method such as distillation at atmospheric or reduced pressure or chromatographic methods.

The invention is illustrated by the following examples. In all cases, the proton and fluorine nuclear magnetic resonance spectra were in accord with the assigned structures.

EXAMPLE 1

N-tert-butylbis(trifluoromethyl)ketenimine

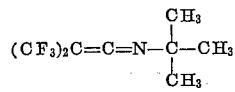

To 2.69 g. (0.0155 mole) of di-tert-butylsulfur diimide in 10 ml. of dichloromethane was added 6 g. (0.031 mole) of bis(trifluoromethyl)thioketene with occasional cooling to keep the temperature at about 20° C. The solution was allowed to stand for 4 hours and then distilled to give 3.5 g. (48% yield) of the N-tert-butylbis(trifluoromethyl)ketenimine, B.P. 66–68° C./109 mm., $n_D^{26}$ 1.3513.

*Analysis.*—Calcd. for $C_8H_9F_6N$: C, 41.20; H, 3.89; F, 48.88; N, 6.01. Found: C, 41.41; H, 4.17; F, 48.36; N, 6.16.

The infrared spectrum showed absorption at 4.77μ.

EXAMPLE 2

N-(methylbis(trifluoromethyl)ketenimine $$(CF_3)_2C=C=N-CH_3$$

The reaction was carried out as in Example 1 but with the use of dimethylsulfur diimide. After the solution had stood for 1 hour, the volatile material was removed at 8 mm. pressure and condensed in a trap cooled by a slurry of powder carbon dioxide and acetone. The material in the trap was then distilled to give a 17% yield of N-methylbis(trifluoromethyl)ketenimine, B.P. 55–56° C./ 184 mm., $n_D^{25}$ 1.3345.

*Analysis.*—Calcd. for $C_5H_3F_6N$: C, 31.43; H, 1.58; N, 7.33. Found: C, 31.45; H, 1.81; N, 7.11.

The infrared spectrum showed absorption at 4.74μ.

EXAMPLE 3

N-n-butylbis(trifluoromethyl)ketenimine $(CF_3)_2C=C=N-CH_2CH_2CH_2CH_3$

The reaction was carried out as in Example 2 but with the use of di-n-butylsulfur diimide and the solution was allowed to stand for 2 days and then distilled to give a 20% yield of N-n-butylbis(trifluoromethyl)ketenimine, B.P. 75° C./61 mm., $n_D^{25}$ 1.3622.

*Analysis.*—Calcd. for $C_8H_9F_6N$: C, 41.20; H, 3.89; N, 6.01. Found: C, 41.12; H, 3.78; N, 5.80.

The infrared spectrum showed absorption at 4.73μ.

The foregoing examples illustrate some representative compounds obtainable by the process of the invention. The described procedure is applicable to the preparation of any other N-alkylbis(trifluoromethyl)ketenimine of formula $(CF_3)_2C=C=N-R$, where R is an alkyl radical, straight chain or branched chain, of 1–18 carbon atoms, for example, those in which R is n-decyl, n-dodecyl, n-octadecyl, 1,1,3,3-tetramethylbutyl, n-hexadecyl, n-tetradecyl, butyl, hexyloctyl, cyclobutyl, cyclopentyl, cyclohexyl, or cycloheptyl. The compounds of this invention having an R group of up to 12 carbon atoms are preferred.

The R group should not be aromatic. An aromatic group would decrease the utility of the compounds as textile-treating agents since an aromatic group greatly increases the ultraviolet absorption of the compound and thereby decreases its light stability.

This is illustrated as follows: the ultraviolet absorption spectrum of N-methylbis(trifluoromethyl)ketenimine, the product of Example 2, shows only a single weak band at 271 mμ (ε=199). In contrast, the ultraviolet absorption spectrum of N-phenylbis(trifluoromethyl)ketenimine shows much stronger absorptions at 302 mμ (ε=987), 288 mμ (ε=1120), and 230 mμ (sh) (ε=9940). These stronger absorptions result from the conjugation of the C=C=N group with the aromatic ring. This conjugation persists after reaction of the compound with a fabric substrate and renders the material sensitive to degradation by ultraviolet light. In contrast, the ultraviolet light absorption of the alkyl compounds of this invention is minimal and tends to become less or disappear after fixing on a fabric substrate.

The compounds of this invention are useful as antistatic agents for wool. The wool is heated with the compound at about 100° C. for about 30 minutes and then dried or washed free of the compound with a solvent such as trichloroethylene or dichloromethane. The antistatic effect is demonstrated by rubbing a strip of the treated fabric with a plastic rod. The fabric shows little attraction to the rod. A control sample of untreated fabric is strongly attracted to the rod after rubbing. This utility is illustrated by the following example.

EXAMPLE A

A swatch of clean, undyed wool, fabric was dripped in N-n-butylbis(trifluoromethyl)ketenimine. The dripping wet fabric was sealed into a glass container and heated at 105° C. for 30 minutes. The fabric was then removed from the container and washed thoroughly in dichloromethane to remove excess treating agent. A strip of the treated fabric was rubbed with a plastic rod. The treated fabric showed little attraction to the rod. A control strip of untreated wool fabric was strongly attracted to the rod after rubbing.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formula $(CF_3)_2C=C=N-R$ wherein R is alkyl of up to 18 carbons or cycloalkyl of 4–7 carbons.

2. The compound of claim 1 wherein R is tert-butyl; said compound being N-tert-butylbis(trifluoromethyl)-ketenimine.

3. The compound of claim 1 wherein R is methyl; said compound being N - methylbis(trifluoromethyl)ketenimine.

4. The compound of claim 1 wherein R is n-butyl; said compound being N - n-butylbis(trifluoromethyl)ketenimine.

5. A process for preparing a compound of claim 1 which comprises reacting bis(trifluoromethyl)thioketene with a dialkylsulfur dimide of the formula $R-N=S=N-R$ wherein R is alkyl of 1–18 carbons or cycloalkyl of 4–7 carbons at a temperature in the range of 0 to 100° C.

6. The process of claim 5 wherein hte dialkylsulfur diimide is di-tert-butylsulfur diimide.

7. The process of claim 5 wherein the dialkylsulfur diimide is dimethylsulfur diimide.

8. The process of claim 5 wherein the dialkylsulfur diimide is di-n-butylsulfur diimide.

References Cited

Gambaryan, "Izvest. Akad. Nauk. USSR," vol. 4, pp. 749 to 750 (1965).

Staudinger, "Helv. Chim. Acta," vol. 4, pp. 866 to 868 (1921).

Clemens, "Tetrahedron Letters," vol. 20, pp. 1491 to 1495 (1965).

Meites, "Advanced Analyt. Chem.," pp. 236 and 237 (1958).

BERNARD HELFIN, Primary Examiner

MATTHEW M. JACOB, Assistant Examiner

U.S. Cl. X.R.

8—128; 252—8.8